US008924992B2

(12) United States Patent
Wu et al.

(10) Patent No.: US 8,924,992 B2
(45) Date of Patent: Dec. 30, 2014

(54) SYSTEM AND METHOD FOR INDEPENDENT MEDIA AUDITING AND MEDIA SERVING FOR MARKETING CAMPAIGNS PRESENTED VIA MEDIA DEVICES IN PUBLIC PLACES

(75) Inventors: Wan-Chung W. Wu, Bellevue, WA (US); Kourosh Lashgari, Redmond, WA (US); Paul Dixon, Seattle, WA (US); Thomas C. Opdycke, Bellevue, WA (US)

(73) Assignee: DS-IQ, Inc., Bellevue, WA (US)

( * ) Notice: Subject to any disclaimer, the term of this patent is extended or adjusted under 35 U.S.C. 154(b) by 1408 days.

(21) Appl. No.: 12/329,497

(22) Filed: Dec. 5, 2008

(65) Prior Publication Data

US 2009/0150918 A1 Jun. 11, 2009

Related U.S. Application Data

(60) Provisional application No. 61/992,647, filed on Dec. 5, 2007.

(51) Int. Cl.
| | |
|---|---|
| *H04H 60/35* | (2008.01) |
| *H04H 60/37* | (2008.01) |
| *H04H 20/14* | (2008.01) |
| *G06Q 20/14* | (2012.01) |
| *H04N 7/173* | (2011.01) |
| *H04H 20/10* | (2008.01) |
| *H04H 60/63* | (2008.01) |
| *H04H 60/66* | (2008.01) |
| *H04N 21/25* | (2011.01) |
| *H04N 21/442* | (2011.01) |
| *H04N 21/81* | (2011.01) |

(52) U.S. Cl.
CPC ............. *H04N 7/173* (2013.01); *H04H 20/103* (2013.01); *H04H 20/14* (2013.01); *H04H 60/63* (2013.01); *H04H 60/66* (2013.01); *H04N 21/252* (2013.01); *H04N 21/44222* (2013.01); *H04N 21/812* (2013.01)
USPC .................. 725/9; 725/14; 725/22; 705/14.47

(58) Field of Classification Search
CPC .................... G06Q 30/0241; H04N 21/44204; H04N 21/24
USPC ............. 725/9, 14, 22, 32, 34–36, 74, 78, 85; 705/1, 14.4–14.45, 14.61, 14.68, 14.47
See application file for complete search history.

(56) References Cited

U.S. PATENT DOCUMENTS 7,614,065 B2 * 11/2009 Weissmueller et al. ......... 725/22
8,315,456 B2 * 11/2012 Hicks ............................ 382/154

(Continued)

*Primary Examiner* — Benjamin R Bruckart
*Assistant Examiner* — Jason Thomas
(74) *Attorney, Agent, or Firm* — Crowell & Moring LLP

(57) ABSTRACT

An independent auditing and ad service system that may be utilized in conjunction with a system for presenting marketing campaigns to audiences via a network of players located in public locations. Independent agents in the players monitor media content that is presented to audiences during marketing campaigns and generate independent agent playlogs that are provided to a content registry service. The content registry service compares the independent agent playlogs with playlogs that are provided by a network operator to validate the network-operator-generated playlogs. The independent agent playlogs may also be provided to an analytics service where they are used to analyze the performance of marketing campaigns. Based on the analyzed performance, the service may determine that the media content being presented to audiences via the media players should be changed. The independent agents may be instructed to implement recommended changes by modifying the media content being presented on the players.

29 Claims, 7 Drawing Sheets

(56) References Cited

U.S. PATENT DOCUMENTS

| | | | |
|---|---|---|---|
| 2001/0027491 A1* | 10/2001 | Terretta et al. | 709/238 |
| 2006/0247983 A1* | 11/2006 | Dalli | 705/27 |
| 2007/0174877 A1* | 7/2007 | Papillon et al. | 725/86 |
| 2008/0059293 A1* | 3/2008 | Hengel | 705/14 |
| 2008/0250448 A1* | 10/2008 | Rowe et al. | 725/32 |

* cited by examiner

SYSTEM AND METHOD FOR INDEPENDENT MEDIA AUDITING AND MEDIA SERVING FOR MARKETING CAMPAIGNS PRESENTED VIA MEDIA DEVICES IN PUBLIC PLACES

CROSS-REFERENCE TO RELATED APPLICATIONS

This application claims the benefit of U.S. Provisional Patent Application Ser. No. 60/992,647, entitled "FOR INDEPENDENT MEDIA AUDITING AND AD SERVING FOR MARKETING CAMPAIGNS, SUCH AS THOSE PRESENTED VIA ELECTRONIC SIGNS, SPEAKERS, KIOSKS AND OTHER MEDIA DEVICES IN PUBLIC PLACES" filed on Dec. 5, 2007, which is incorporated herein by this reference in its entirety.

BACKGROUND

Advertising in stores, malls, and other out-of-home, public spaces where goods and/or services may be sold or where marketers would like to reach certain audiences (collectively referred to herein as "public locations") is increasingly becoming a popular choice as more marketers shift their budget allocation away from traditional print and TV. Effective advertisements that deliver relevant messages to the right customers at the right time have a huge potential to influence purchase decisions as well as build long-term brand equity for their advertisers. The use of media devices—e.g., video displays, speakers, etc.—in public locations promises to revolutionize marketing by providing dynamic and captivating content to valuable audiences.

FIG. 1 is a flow diagram that illustrates a system that can be employed to conduct a digital media marketing campaign in public locations. A marketing campaign is any audio and/or visual campaign that includes one or more unit of media content (e.g., a series of audio or video clips containing advertisements for products and services). Marketing campaigns may relate to single products, services, or concepts, or may relate to multiple products, services, or concepts from a manufacturer or provider. An ad buy and content service 101 includes an ad buy service 101a that allows media buyers to work with a vendor, a retailer, or other network operator that owns or operates a media device network 103. The media buyer may plan a marketing campaign with a pre-agreed play commitment based on audience reach, frequency, and relevance 101b. Various campaign reference data 101c, which could include logistics of a campaign, promoted products, network topology and media device characteristics and location information, as well as media content files and content metadata 101e created from content services 101d, is transmitted to a media controller 102 or multiple media controllers.

A typical media controller 102 consists of one or more services to manage the campaign data and media content distribution. For example, a content authoring service 102b may be provided to allow content to be customized to a format that is suitable for players 103a in the media device network 103. A campaign workflow and management service 102a generates network-operator-specific campaign programming/media playlists 102b based on play commitments, content attributes, and a set of business constraints. A playlist is a schedule that provides instructions on which media content to present, as well as the order and/or specific time of presentation. A playlist may contain a single marketing campaign or may contain elements from many different marketing campaigns. The playlists and the associated media files/content are then distributed by downloading or streaming from a content distribution service 102d to a media device network 103 or multiple media device networks. A media device network is comprised of two or more media players that are capable of presenting the marketing campaign to audiences in public locations.

Players 103a in the media device network 103 present campaign media in accordance with the received playlists. Players are designed to communicate with one or more remote controllers and cache whole or partial units of media content in local storage before the media content is played. A media serving and reporting service 103b monitors the presentation of campaign media and produces media playlogs 103c. A playlog identifies the media content that is presented by the corresponding player during a particular time frame. For example, a playlog may be a set of records that are correlated with a player and/or media device network, each record containing a reference that uniquely identifies a presented unit of media content, a time stamp associated with the presentation, a date stamp associated with the presentation, and any other data that may be recorded by the player that pertains to the presentation of the associated unit of media content. The playlogs 103c may be used for various reporting purposes, such as billing, performance monitoring, and proof of play. For example, an advertiser that pays X dollars to have an advertising campaign presented Y times on a retail store chain's media devices at a particular time slot may be entitled to receive a proof-of-play report from the network operator that confirms that such presentation was made.

The playlogs 103c may also be provided to an analytics service 104. The analytics service includes a measurement and optimization service 140a for the purpose of measuring and optimizing the presentation of the marketing campaign. The analytics service may analyze the effectiveness of the campaign and recommend experimental designs and modified playlists for further media optimization based on audience response data as reported by the media device network 103. Common functionalities provided by the analytics service include any marketing science such as (a) market mix analysis, (b) customer segmentation and targeting, and (c) experimental design. The analytics service may measure effectiveness, recommend actions based on audience responses, and optimize what, when and how marketing media content should be served. Because analytics services are typically very specialized, they are conventionally not provided intrinsically. This means that the analytics service 104 is usually an external service, not associated with the controller 102 and provided by a third-party service provider.

The analytics service 104 provides playlist and media recommendations 104b to the ad buy service 101a and the campaign workflow and management service 102a where they are used to improve the efficacy of marketing campaigns. Due to a lack of a widely-accepted industry standard, it is rare that two different media device networks are able to generate the same format of playlogs. In order to allow the analytics service 104 to interact with the media controller 102 for the exchange of campaign schedule heuristics and results, it is therefore often necessary to provide one or more custom adaptors 105 to enable such data exchange.

Although dashed-lines are drawn in FIG. 1 to cluster various components or services for purposes of this description, the clustered components or services are purely conceptual. Depending on how the system is implemented, the system can potentially have different partitioning with different service boundaries. For example, it is common for a party that owns or operates a media device network to implement some basic functionality of content authoring while allowing its partner to create specialized components for more sophisticated content editing. It is also very common for a media device network owner to provide basic reporting, but allow third-party analytics services to be used to assess and model audience and customer responses. It will be appreciated that each component or service in FIG. 1 can be hosted on its own server or share a server with other services. In some embodiments, each media controller 102 resides in a closely monitored network operation center (NOC) and the players reside at venues where media content are played. The media controller and players can communicate with each other over a network, which can be a satellite, a virtual private network, the public Internet, or other network. Communication can be in the form of broadcast multicasting, file transfer, streaming, etc.

To ensure that players 103a in a media device network 103 are indeed fulfilling a presentation commitment, it would be beneficial to validate the network-operator-generated playlogs 103c. The following problems, however, currently exist for the validation of marketing campaigns presented on public space digital media device networks:

1. Potential for fraudulent reports. Media buyers currently rely on network operators operating the digital media players to provide proof-of-play reporting. The playlogs provided by the network operator for billing purposes are potentially subject to fraud or misrepresentation, whether intentionally or unintentionally. In the unintentional case, a network operator creating a programming playlist can loop multiple ads. In some cases, the play-counts for each ad can be calculated up-front and used for billing invoices. However, calculating play-count prior to the presentation of marketing media on players is not necessarily accurate when the players are not be functioning (e.g., during a dark screen due to hardware failure or network outage) or when a campaign is not running as planned due to stock being out, etc. In order to overcome problems associated with pre-calculated play counts, the playlogs from the media players are critical in proving that actual presentation indeed happened. However, even the playlogs do not necessarily guarantee that presentation was indeed accurately recorded. Sometimes during the transmission of playlogs, errors can be introduced due to network package loss and other inherent network quality of service issues.

2. Manual inspection and sampling lacks precision and scalability. In some situations, manual auditing of the presentation of marketing media may be conducted. For example, careful observations by humans of players in all venues can be conducted or, as more commonly done, a sampling approach based on observations performed in a few venues can be extrapolated to estimate the accuracy of a network operator's playlogs. The lack of standard auditing practices for in-store and public space media device networks, however, means that the quality of auditing services provided by third-parties may vary tremendously. In addition, although a manual process may be effective for a small number of physical locations, a manual process is not precise, is more likely to be error-prone, and does not scale well when a campaign spans a large network of stores and other public locations.

3. The lack of granular playlogs. Some digital media devices fundamentally do not have the ability to provide granular level playlogs for each unit of media content played. For example, some media devices serve reports only on a play count or an aggregated basis. In addition, some digital media devices are not sophisticated enough to produce any playlogs. In essence, it is not guaranteed that any media device network to be audited has the capability of providing reliable and accurate playlogs.

4. The difficulty of integrating with an analytics service for measurement and optimization purposes. As previously discussed, in order to allow the analytics service 104 to interact with the media controller 102 for the exchange of campaign schedule heuristics and results, it is often necessary to provide one or more custom adaptors 105 to enable such data exchange. Given the custom nature of such adaptors, and the requirement to generate new adaptors as new playlist formats are generated, it will be appreciated that the approach is ad hoc, time-consuming, and non-scalable.

In light of the foregoing challenges, a need therefore exits for a system that allows the simple, timely, and accurate validation of marketing campaigns presented on media device networks that are located in public locations.

DETAILED DESCRIPTION

Figure 1:
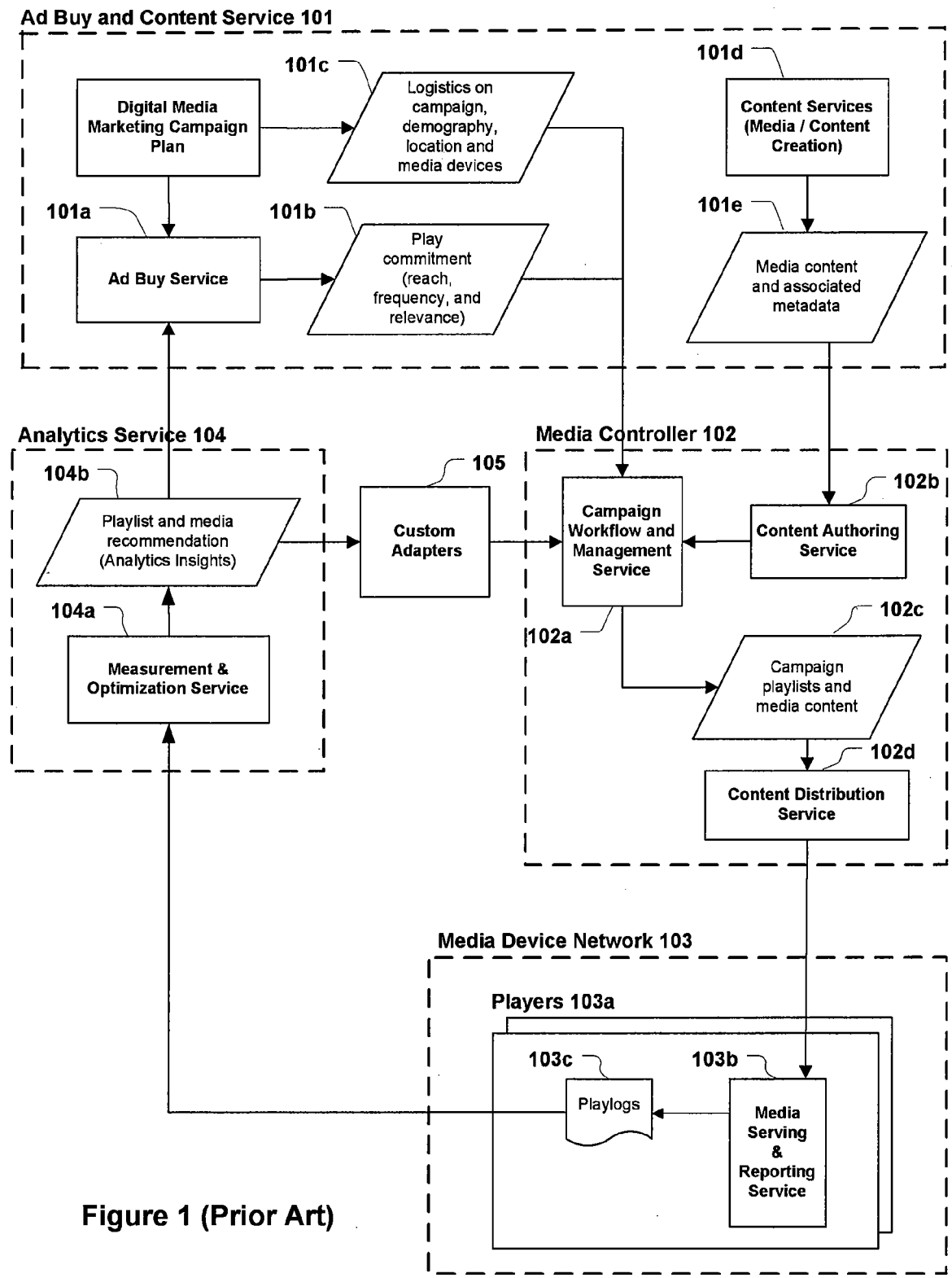
FIG. 1 is a flow diagram of a system for buying, creating, distributing and running an analytically-driven marketing campaign to media players located in public locations.

An independent auditing and ad service system is disclosed that may be utilized in conjunction with a system for presenting marketing campaigns to audiences via a media device network of players located in public locations. The independent auditing and ad service system introduces independent agents into the players. The independent agents monitor media content that is presented to audiences via the players during marketing campaigns. The independent agents generate independent agent playlogs that are provided to an independent agent content registry service. The content registry service may compare the independent agent playlogs with playlogs that are generated by the media players and provided by the network operator of the media device network. By comparing the two sets of playlogs, one created under the auspices of the network operator and one generated by the independent agents, the content registry service may validate the network-operator-generated playlogs. The independent auditing and ad service system thereby acts to assure marketers that they are receiving the play commitments that they had purchased from the network operator.

In some embodiments, the content registry service also interfaces with an analytics service. The independent agent playlogs may be provided to the analytics service where they are used to analyze the performance of the marketing campaigns. Based on the analyzed performance, the analytics service may determine that the media content being presented to audiences via the media players should be changed in some fashion. For example, the analytics service may determine that media content should be added, deleted, re-ordered, or otherwise modified. The content registry receives such changes from the analytics service and conveys the changes to the independent agents associated with the players. The independent agents directly implement such recommended changes by modifying the media content being presented on the players. By implementing the recommended changes directly, the independent agents are able to make the changes in a timely fashion and without requiring intervention by the media device network operator. As a result, the content registry service is able to better optimize the marketing campaigns since greater experimentation may be performed within a shorter time period.

It will be appreciated that the system and method disclosed herein provides greater accountability of public space digital marketing campaigns. The independent auditing and ad service system generates reliable data reports, thereby improving post-buy analysis and evaluation, and generating more confidence in media buys, more effective media plans, and more trust in the advertising network. In addition, the independent auditing and ad service system reduces integration issues when implemented across media device networks that are operated by different network operators.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 2:
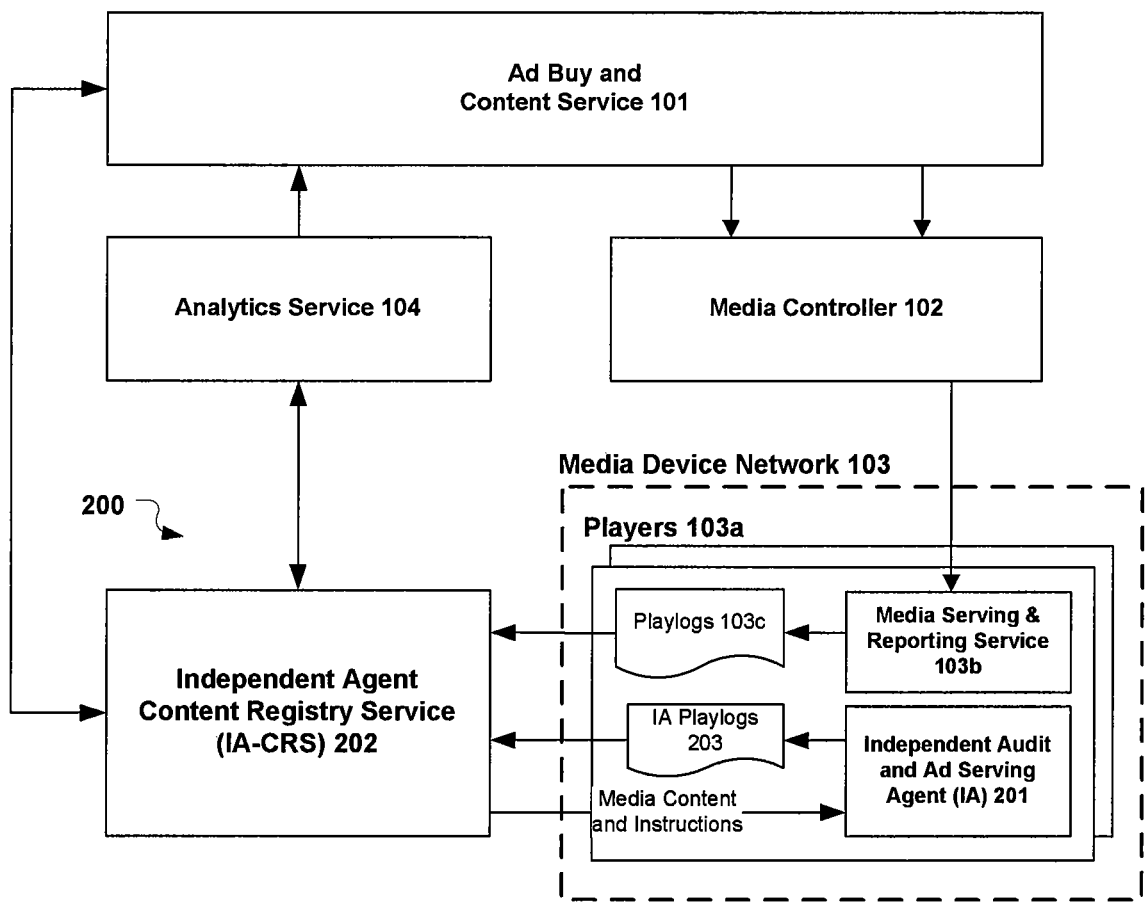
FIG. 2 is a block diagram of an independent auditing and ad service system that introduces an independent agent into the system of FIG. 1 in order to allow auditing of presented media content and the serving of intelligent media content via the media device network.

FIG. 2 is a block diagram of an independent auditing and ad service system 200 that provides independent auditing of media content served by the media device network 103 and serving of intelligent media content via the media device network 103. Such a system can be incorporated in a marketing content distribution system, such as disclosed in commonly assigned U.S. patent application Ser. No. 12/134,992 (SYSTEMS FOR SCHEDULING MARKETING CAMPAIGNS IN PUBLIC PLACES IN ORDER TO ENABLE MEASUREMENT AND OPTIMIZATION OF AUDIENCE RESPONSE) and U.S. patent application Ser. No. 10/913,130 (SYSTEM AND METHOD FOR DELIVERING AND OPTIMIZING MEDIA PROGRAMMING IN PUBLIC SPACES), which are hereby incorporated by reference in their entirety.

To implement the auditing and content-serving functionality, the independent auditing and ad service system 200 is comprised of an independent agent content registry service (IA-CRS) 202 and a plurality of independent audit and ad serving agents (IA) 201. Each of the independent agents 201 is incorporated in one of the players 103a of the media device network 103. Each agent generates an independent agent (IA) playlog 203, which identifies the media content that is presented by the corresponding player during a particular time frame. For example, the playlog may be a set of records, each record including a reference that uniquely identifies a presented unit of media content, a time stamp associated with the presentation, a date stamp associated with the presentation, and any other data that may be recorded by the player that pertains to the presentation of each unit of media content.

The IA playlog from each player is transmitted to the content registry service 202 on a scheduled or unscheduled basis. In some embodiments, for example, the IA playlog is transmitted on a daily basis. In some embodiments, the IA playlog is transmitted after each unit of media content is identified (i.e., each playlog record is transmitted to the content registry service as it is created). As will be described in greater detail herein, the content registry service compares the IA playlogs 203 against the playlogs 103c generated by the network operator. The results of the comparison may be provided to the ad buy and content service 101 to assure marketers that they are receiving the play commitments that they had purchased from the network operator. In addition, the content registry service may provide the IA playlogs 203 to the analytics service 104 to analyze the performance of the marketing campaigns. The analysis may include not only an effectiveness of prior marketing campaigns, but may also take into account various conditional factors such as weather, date (e.g., holidays), time of day, etc. If the analytics service determines that the media content being presented to audiences via the players should be changed in some fashion, the content registry service 202 may receive suggested changes from the analytics service and new media content from the ad buy and content service. Alternatively, the content registry service 202 may determine schedule changes and new or modified media content based on analytical results received from the analytics service. The content registry service transmits the changes in the form of serving instructions (e.g., new or modified play orders) as well as new or modified media content to the independent agent 201. The independent agent then causes the suggested changes to be made to the media content that is being presented on the players 103a, such as by adding, removing, or changing the media content in accordance with the serving instructions.

Those skilled in the art will appreciate that although the analytics service 104 and the content registry service 202 are depicted as separate services, in some embodiments the two services may be combined and operated by the same party. Moreover, those skilled in the art will appreciate that the content registry service 202 and other aspects of the system may be implemented on any computing system or device. Suitable computing systems or devices include personal computers, server computers, multiprocessor systems, microprocessor-based systems, network devices, minicomputers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

The disclosed independent auditing and ad service system 200 offers several advantages over prior system architectures. In particular:

1. Independent collection and comparison of playlogs. To conduct truly independent auditing, the process of collecting playlogs must not be solely dependent on what the network operator's system reports. The disclosed system enables an independent third party to audit the accuracy of the proof-of-play reports from players. Having the auditing function performed by an unbiased third-party improves the verification accuracy of the media play commitment and reduces the likelihood of fraudulent reports.

2. Reduce integration barrier between existing controllers and players. As previously discussed, in a multi-network scenario where media device networks are run by different network operators using different software systems, custom adapters 105 are required to communicate with each media controller 102 since each media controller has a different set of business logic for managing and distributing playlist programming. In contrast, the present system 200 allows media content to be directly injected to each player via the independent agent 201. The same agent may be deployed to multiple networks with little or no understanding of each network's business logics. The use of independent agents thereby eliminates the need for custom integration between an analytics service and a media controller.

3. Ability to serve media content based on analytics insight directly. Since the independent agent 201 directly receives media content and serving instructions (e.g., new or modified play orders) from the registry service 202, it is possible to avoid distributing media content via controllers 102. The direct injection of media content allows the system to intelligently insert, delete and swap media content based on customer response insights in a timely fashion. The direct injection introduces less latency than the controller-based content-serving model, and enables dynamically testing various marketing campaigns with timely feedback from customer responses. Dynamic testing with shorter cycle times increases the accuracy and value of the analytical results that the analytics service 104 can offer to marketers.

Figure 3:
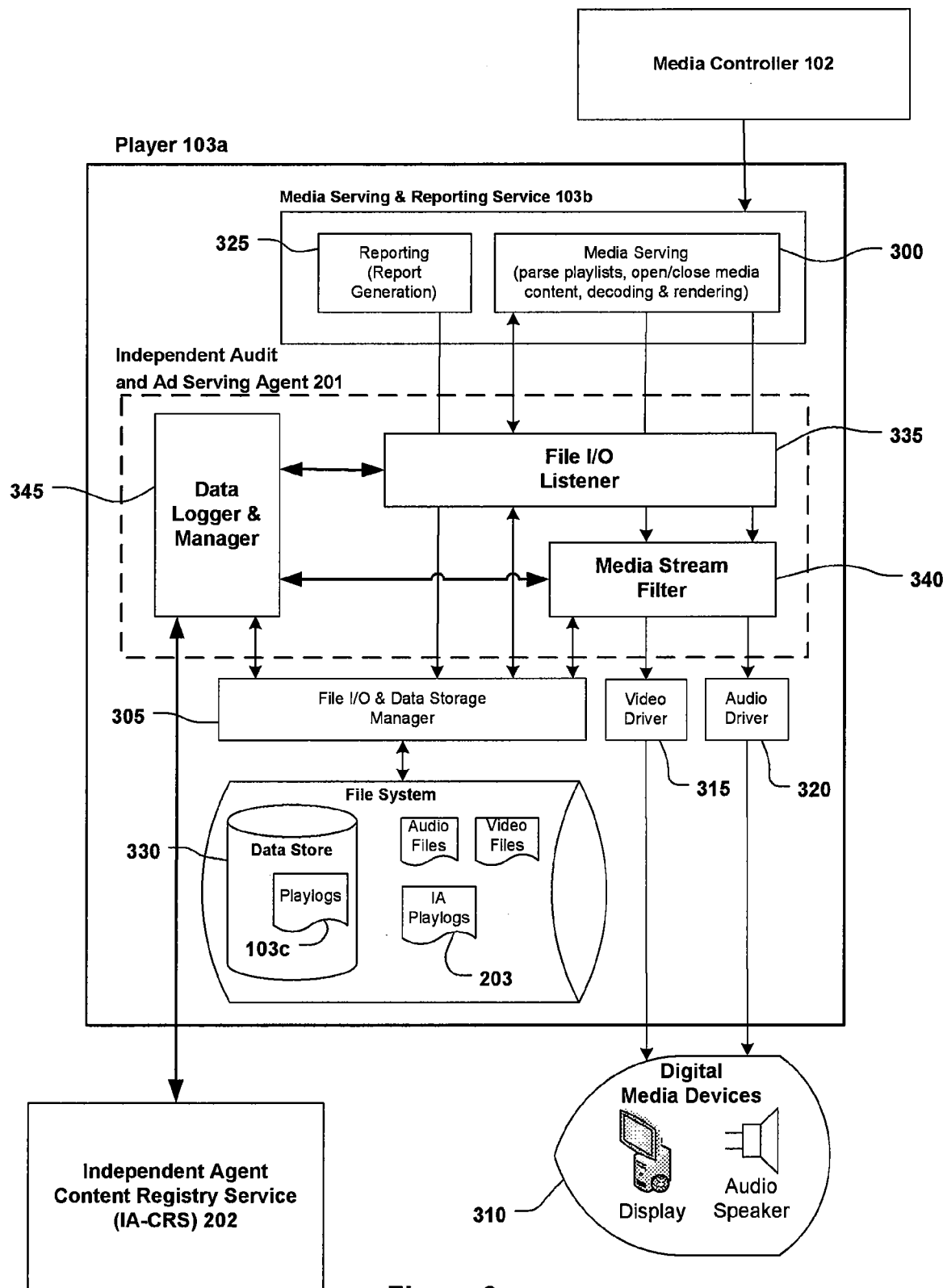
FIG. 3 is a block diagram of a media player and the independent agent that audits media presented by the player and allows intelligent media content to be served by the player.

FIG. 3 is a block diagram of the player 103a and the independent agent 201 that audits media presented by the player and allows intelligent media content to be served by the player. As previously described, each player incorporates a media serving and reporting service 103b that is responsible for presenting media content and reporting on the presentation. The media serving and reporting service 103b receives playlists and media content from media controller 102 over a public or private network. The media serving and reporting service 103b includes a media serving component 300 that interprets playlists, calls a file I/O manager 305 of the player's operating system to open and close stored audio and video media files, and delivers media streams to digital media devices 310 such as video displays or audio speakers. The player includes a video driver 315 and an audio driver 320 to receive I/O or digital signal requests that instruct the media content to be presented on displays and speakers accordingly. Typically, the media serving and reporting service 103b includes a reporting component 325 that writes playlogs 103c to a data storage area 330, such as a database or other local repository. The reporting component 325 accesses the data storage area via the file I/O manager 305.

As shown in FIG. 3, the independent agent 201 employs a file I/O listener 335 and a media stream filter 340 to intercept requests generated by the player's media serving and reporting components. The file I/O listener 335 intercepts or detects media files that are opened or accessed by the media serving component (e.g., such as when the media file is about to be presented by the player). Requests intercepted by the file I/O listener can exist in any form, including but not limited to files operations such as open, close, read, write, change, etc. Similarly, using an approach similar to a typical video encoder/decoder, the media stream filter 340 intercepts or detects a unit of media content in a digital signal stream when the unit of media content is starting or finishing play. Media content may be detected in a digital signal stream based on an embedded signature or other mechanism. The file I/O listener and the media stream filter can be deployed individually or together depending on the support provided by the player's native operating system (OS). When media content is detected by the file I/O listener or media stream filter as being presented on a digital media device, a data logger and manager 345 records the presentation of the media content in one or more independent agent playlogs 203. The IA playlogs 203 may be stored in the file system of the player, which may be accessed by the data logger and transmitter 345 via the file I/O and data storage manager 305. On a scheduled or unscheduled basis, the IA playlogs 203 are transmitted by the data logger and manager 345 to the content registry service 202. Because the media serving and reporting service 103b is not aware of the underlying activities performed by the independent agent 201 at the operating system level, the IA generated playlogs 203 are not subject to the same bias that may be introduced to network-operator-generated playlogs 103c from its own reporting system.

To aid the independent agent 201 in detecting media content and constructing IA playlogs, it is helpful for the independent agent to have information about the set of media content that may be presented by the player. Having information about the set of media content that might be presented enables the listener 335 and filter 340 to more readily and accurately detect a unit of media content when it is presented. A list of possible media content that might be presented is therefore maintained by content registry service 202. The list of media content can be compiled from multiple sources, including from the advertiser's content service providers, from existing in-house ads or print circular ads, or from other content management services. Each unit of media content will have a unique ID (a "signature") associated with it, whether a watermark, a code (e.g., randomly generated, MD5 hash, GUID0), a first frame of the content (e.g., a unit of media content may be identified by a heuristic analysis of the first frame in the unit of media content), an unambiguous media file name/path/moniker, or other identifying indicia. To ease the burden of compiling the list of media content, a user interface can be provided to allow content suppliers to register their content with the operator of the content registry service 202. In addition, a programming interface can also be created for the purpose of automating the content collection process from content management services. As part of the collection process, the content registry service 202 may ensure that each unit of media content is unique and can be identified by its signature. All or portions of the list of known media are periodically transmitted by the content registry service to the independent agents 201. The known media list allows the listener 335 and the filter 340 to more accurately detect the identity of intercepted files and streams, since the list reduces the set of possible media content that must be searched in order to identify a particular unit of media content.

Some players 103a employ commercially available systems, such as MICROSOFT WINDOWS or LINUX and some players have their own proprietary systems developed by the player's manufacturer. Most commercially available operating systems provide mechanisms that allow their core file system and media control capability to be extended by third-party software. For example, as will subsequently be described with respect to FIG. 7, MICROSOFT provides an extensible file system driver mechanism that allows anti-virus software vendors to monitor file read/writes in order to catch any unauthorized access to files. In the previous description, it is assumed that the operating system of the player provides lower-level functionality required to handle media playback, input/output and data access, data storage, and network communications at the hardware level.

While not illustrated in FIG. 3, additional listeners can also be included in the independent agent 201 to intercept other types of requests from the media serving and reporting service 103b. For example, a status listener could be provided to intercept digital signals that reflect the proper functioning of the digital media devices 310 or of the other components of the player. The status listener could detect, for example, when an error condition exists in one of the digital media devices or when a digital media device enters a power saving mode (e.g., such as during hours of closure at a place of business). The status listener would prevent over-counting of media content plays when display hardware malfunctions despite the player properly serving media content according to the playlist. For example, if a media device is broken or turned off, even though the player may stream media content to the media device, the independent agent will not capture in the IA playlogs that such media content was presented. The file I/O listener 335 and media stream filter 340 are therefore intended to be representative, and not limiting. Moreover, those skilled in the art will also appreciate that the depiction of the file I/O listener 335, the media stream filter 340, and the data logger and manager 345 in FIG. 3 is intended to be a logical representation, rather than a physical representation. Functions performed by the listener, the filter, and the logger and manager may be merged or broken up into one or more components and services.

As previously described, the content registry service 202 may use the IA playlogs 203 both to audit media content actually presented on the player, but also to assess the performance of a marketing campaign and directly make changes to the marketing campaign. To make changes to the marketing campaign, the data logger and manager 345 is coupled to the media stream filter 340. When a particular unit of content is detected by the file I/O listener 335 or the media stream filter 340 as the unit of content is either accessed or started to be streamed, the data logger and manager 345 can intelligently swap out or supplement the detected content with new or modified content and deliver the new or modified content through the media stream filter 340. For example, the data logger and manager may replace the detected content with new or modified content, may insert the new or modified content after the detected content, or may cause the detected content to be skipped. The new or modified content is based on the recommendation and media content delivered from the content registry service 202. It will be appreciated that the independent agent eliminates the dependency on each controller's business logics by independently collecting playlogs and serving media content independently of player software by working directly with the underlying operating system layer of the player.

While the operation of the system described herein utilizes the file I/O listener 335 or media stream filter 340 to detect the presentation of media content and allow changes to be made to the presentation of a marketing campaign, it will be appreciated that the determination of when to change a marketing campaign by inserting, replacing, or skipping content can alternatively or additionally be based on date and time. For example, the serving instructions provided by the content registry service 202 may specify modifications of a presented marketing campaign at a fixed time (e.g., at 8 am every morning) or at a fixed date (e.g., on a particular holiday). When such a time or date is reached, in accordance with the serving instructions the data logger and manager 345 may cause new or modified media to be inserted into a marketing campaign, may cause new or modified media to replace certain content in the marketing campaign, or may cause content to be skipped in the marketing campaign.

Figure 4:
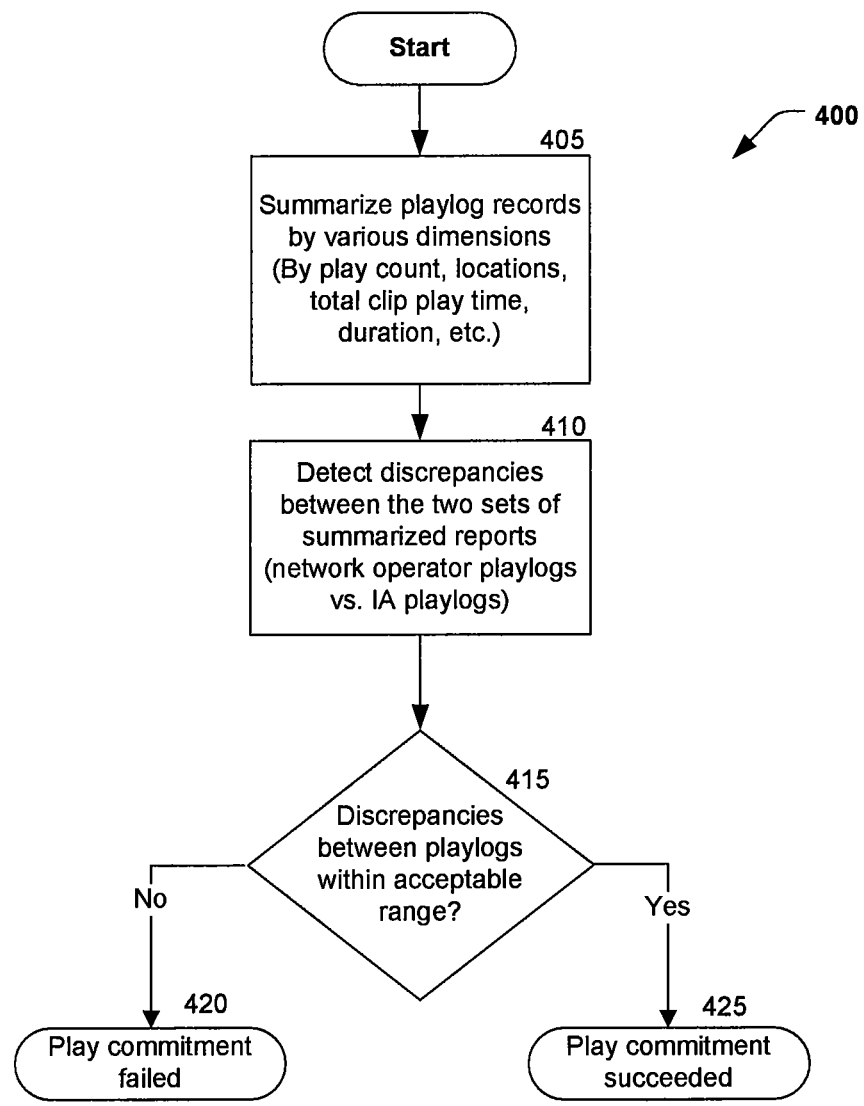
FIG. 4 is a flow chart of an auditing process that is implemented by the independent auditing and ad service system.

On a scheduled or unscheduled basis, the system may assess whether a network operator is meeting an agreed-upon play commitment by comparing network operator-generated playlogs 103c and IA playlogs 203. To determine if a play commitment is being met, various methods can be applied. These methods could be as simple as a brute force comparison of differences between every record in the playlogs, or as sophisticated as applying artificial intelligence and statistics modeling to find discrepancies and anomalies between the two sets of playlogs. FIG. 4 is a flow chart of a representative process 400 that can be used to determine compliance with a play commitment. At a block 405, records from the network operator playlogs 103c and the IA playlogs 203 are consolidated into a summarized report by different dimensions— e.g., the play count or play time are summarized by duration, by hour, by location, by store, etc. At a block 410, the summarized report is used to detect discrepancies between the network operator playlogs and the IA playlogs. Discrepancies may include, for example, extra records in the network operator playlogs that represent presentations of media content that are not contained in the IA playlogs. Discrepancies may also include differences in the expected date, time, and/or length of a presentation of a unit of media content. At a decision block 415, a test is made to determine whether the number of discrepancies exceeds an acceptable threshold. It is conceivable that compliance criteria for such auditing can be established between a media buyer and network operators before a campaign starts, or the compliance criteria may follow guidelines established from industry auditing standard bodies (e.g., Media Auditing Council, Internet Audit Bureau, Traffic Audit Bureau, etc.). In either case, if the discrepancies are too large (i.e., the IA playlogs differ from the network operator playlogs by a greater than acceptable amount), processing continues to a block 420 where the media presentations reflects by the playlogs are deemed not to have satisfied the agreed-upon play commitment. Otherwise, processing continues to a block 425 where the media presentations reflected by the playlogs are deemed to have satisfied the agreed-upon play commitment. When the process 400 is automated, the summarization of playlog records and detection of discrepancies can be efficiently performance by model business intelligence or custom programs. The results of the process 400 may be used by marketers, for example, to negotiate new and/or modified rates for the display of media content on the media device network.

Figure 5:
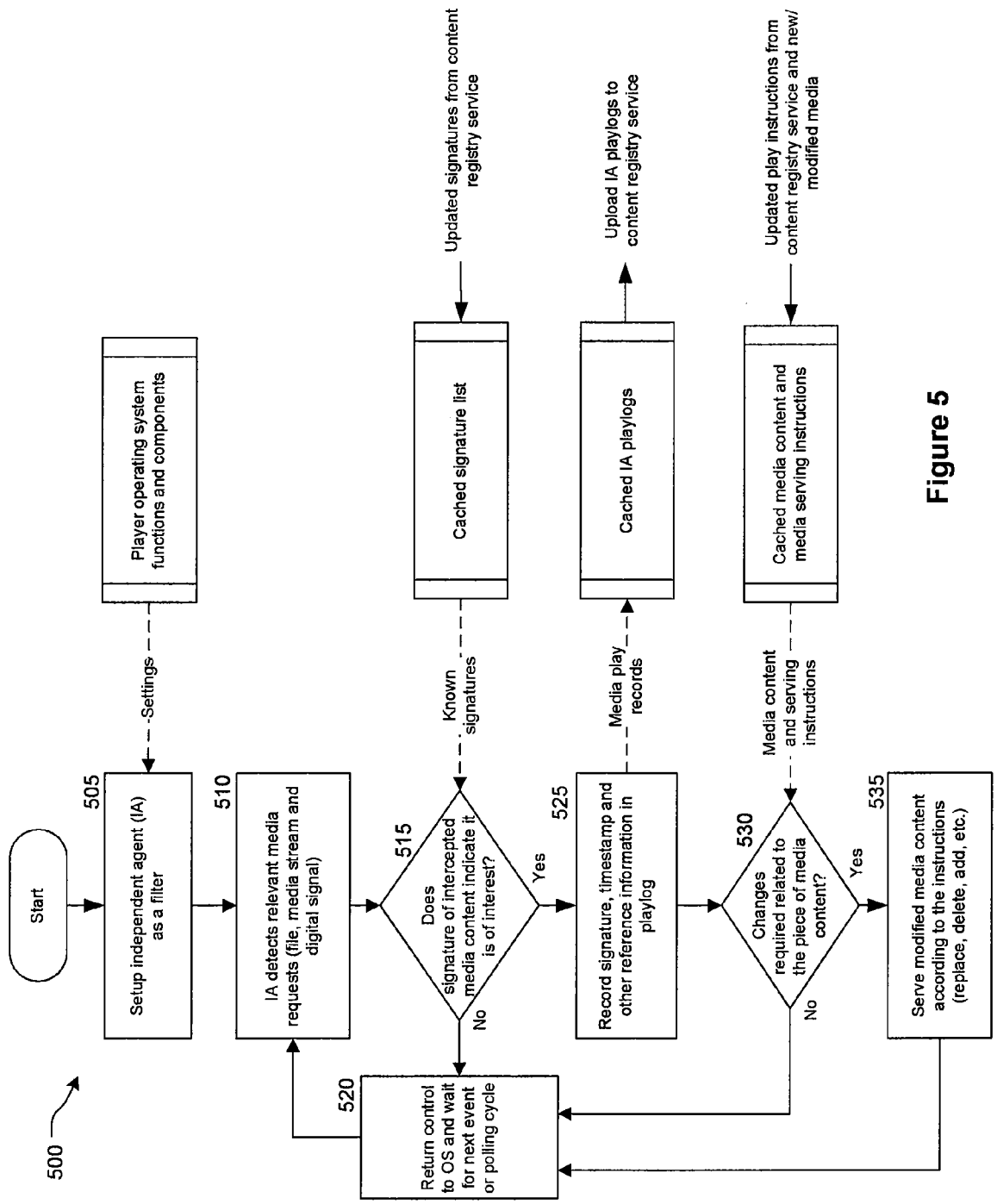
FIG. 5 is a flow chart of a process implemented by the independent auditing and ad service system to construct independent playlogs and serve media content.

FIG. 5 is a flow chart of a process 500 implemented by the independent auditing and ad service system 200 to construct independent playlogs and serve media content. At a block 505, the independent agent 201 that is installed at a player goes through a setup process that enables the independent agent to intercept requests from the player media serving component 300 and reporting component 325 to the file I/O and data storage manager 305 functions of the operating system. This may involve allowing the independent agent to register a callback function to the operating system to receive notifications concerning relevant file, media stream, digital signals and other activities coming from the player's media serving and reporting components. In some embodiments, the independent agent can be setup as a daemon or service on a player where it may perform constant polling to check on any relevant requests by the media serving and reporting components. In essence, the independent agent is configured as a filter in the player so that it can intercept requests between the player's functional components and various management operations implemented by the player's operating system.

After the initial setup, at a block 510 the independent agent detects relevant media requests from the media serving and reporting service 103*b* of the player. Such media requests may be detected, for example, by receiving a notification from the player operating system or by polling for media requests by the operating system. Part of the request that the independent agent detects contains a unique signature that allows the independent agent to be able to identify which unit of media content that the request corresponds to. At a decision block 515, the independent agent examines the signature from the detected request and determines whether the signature can be correlated with a unit of media content that is known to the agent. The list of known media is cached locally at the independent agent, and can be an inclusion or exclusion list of media, or a combination of both. On a scheduled or unscheduled basis, the cached list of signatures is updated by the content registry service 202 when new media content is introduced for distribution over the media device network. If the signature of the detected request is not recognizable by the independent agent at decision block 515, the detected request is ignored and processing proceeds to a block 520 where control is returned to the operating system and the independent agent waits for the next event notification or for the next polling cycle. If, however, the detected request is recognized by the independent agent at decision block 515, processing continues to a block 525.

At block 525, the independent agent logs information about the detected request in the independent agent playlog. Such information may include a timestamp of when the request was made, the signature (i.e., unique ID) identifying the media content, and other information. The locally-cached IA playlog may be uploaded to the remote content registry service 202 on a scheduled or an unscheduled basis. In some embodiments, the playlogs are uploaded only once a day. In other embodiments, each entry in the playlog is immediately transmitted to the content registry service so that the content registry service may immediately begin analysis based on the entry.

At a decision block 530, the independent agent compares the identity of the detected media content with the serving instructions that specify any modifications that are to be made to the marketing campaign. Such serving instructions are periodically downloaded form the content registry service to the independent agent. The serving instructions typically reflect an optimization to a marketing campaign that an analytics service 104 has determined may be more effective than a currently running marketing campaign. Such an optimization may be a result of an analysis of an effectiveness of prior marketing campaigns, and may take into account various conditional factors such as weather, date (e.g., holidays), time of day, etc. If the identity of the detected media content is not associated with any serving instructions at decision block 530, processing continues to block 520 where control is returned to the operating system and the independent agent waits for the next event notification or for the next polling cycle. If, however, the detected media content is associated with a serving instruction at decision block 530, processing continues to block 535 where the independent agent changes the detected media content in accordance with the cached serving instruction. If the detected media content needs to be replaced, skipped, deleted or changed, the independent agent will take appropriate action to modify the media content to match the requirements of the instructions. The altered requests will be returned to the media serving and reporting service 103*b* of the player, and, as a result, new or modified media content will be played instead of the media content identified in the intercepted requests.

Figure 6:
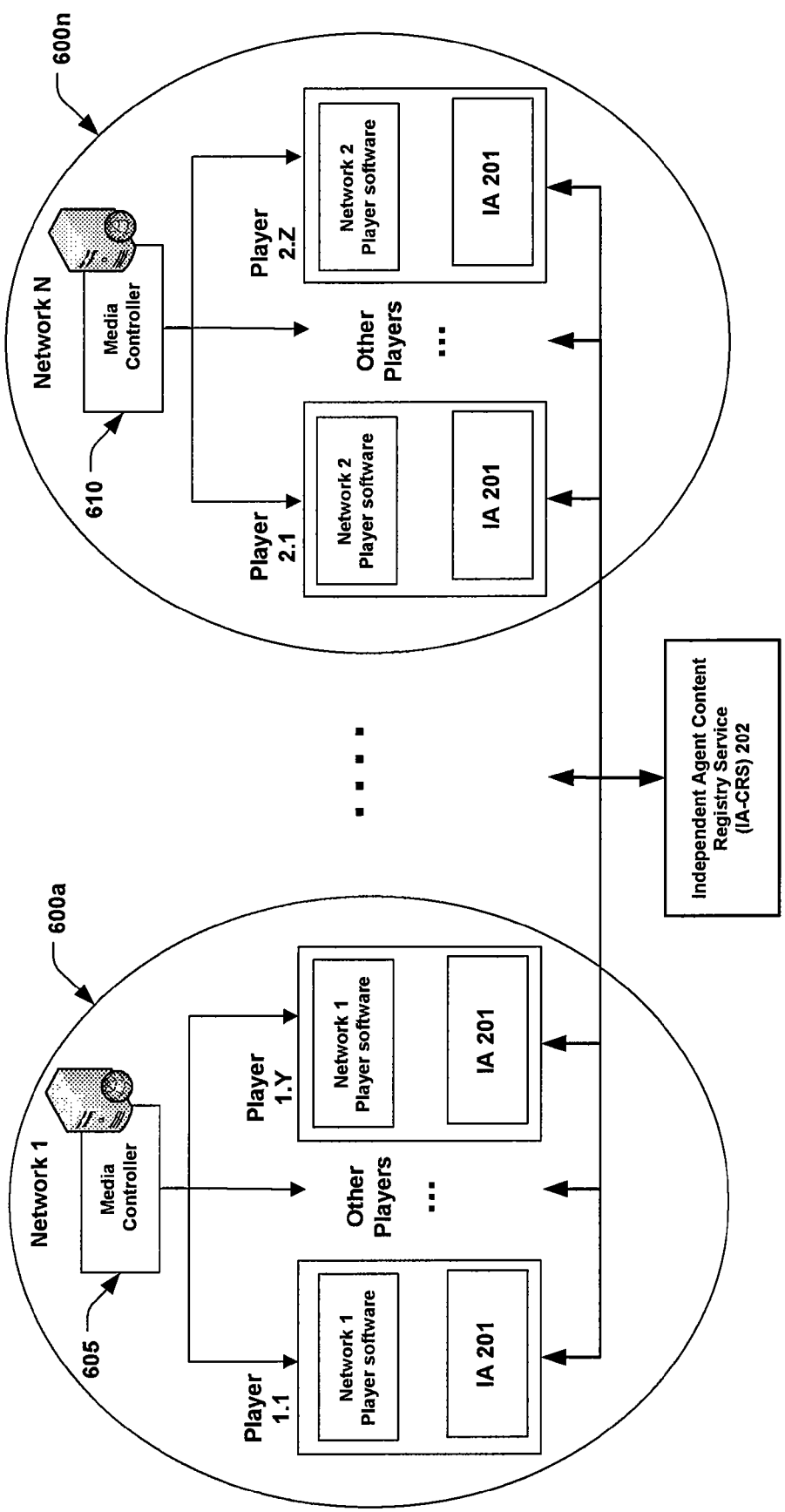
FIG. 6 is a block diagram that depicts the use of independent agents with multiple media device networks.

FIG. 6 is a block diagram that depicts the use of independent agents 201 in an environment having multiple media device networks. In the depicted example, the independent agent content registry service 202 is in communication with a plurality of independent agents 201 that are embedded in the players of several networks 600*a*, 600*b*, . . . 600*n*. Network 600*a* has a media controller 605 that distributes content to Y players (Player 1.1 through Player 1.Y). Each player in network 600*a* includes an embedded independent agent 201. Network 600*n* has a media controller 610 that distributes content to Z players (Player 2.1 through Player 2.Z). Each player in network 600*n* includes an embedded independent agent 201. An advantage of the disclosed independent auditing and ad service system 200 is that even though the media controllers utilized by each network may be different, the independent agent 201 that is embedded in each player may be universal or may have only a limited number of permutations that are dependent on the player operating system and hardware. Because the independent agent is common across different networks, it is possible to easily deploy the system without having knowledge of the media controller or the media device network's business logic.

Figure 7:
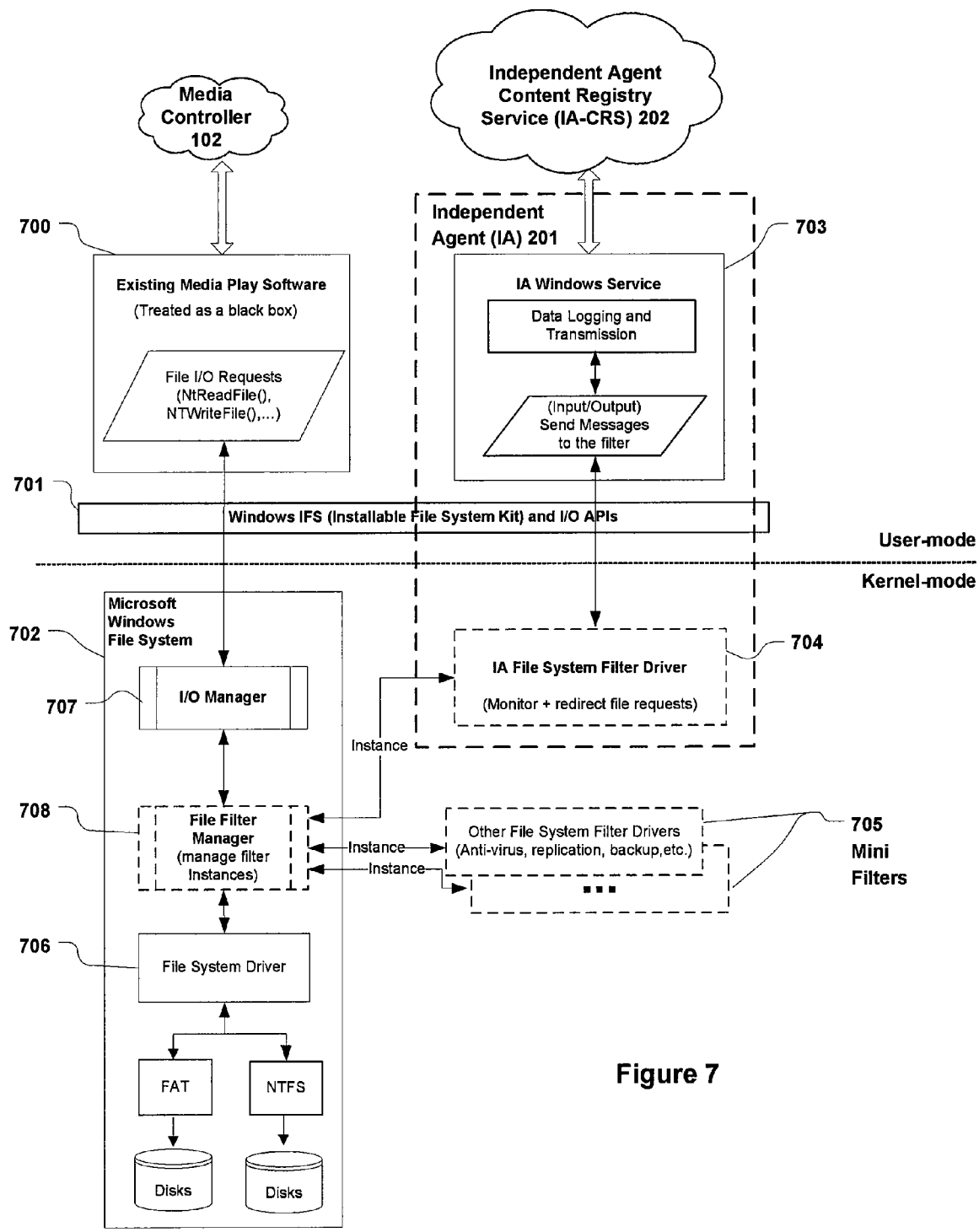
FIG. 7 is a block diagram of the independent auditing and ad service system as implemented in a Microsoft Windows operating system environment.

FIG. 7 is a block diagram that depicts how the described independent auditing and ad service system may be implemented in conjunction with a commercial operating system such as MICROSOFT WINDOWS. Those skilled in the art will appreciate that the system may also be implemented in conjunction with any other commercial operating systems or proprietary systems.

As depicted in FIG. 7, the independent agent 201 includes a file system filter driver 704. The file system filter driver 704 intercepts or otherwise detects requests from media play software 700 that are targeted at a file system 702 or at other file system filter drivers 705. Examples of other file system filter drivers 705 include anti-virus filters, backup agents, and encryption products, etc. By intercepting or detecting a file request before it reaches its intended target (either the file system or another filter driver), the IA file system filter driver 704 can extend or replace functionality that otherwise would have been provided by the original target of the request.

In the illustrated embodiment, the independent agent 201 consists of two major components: a user-mode IA windows service 703 and the kernel-mode IA file system filter driver 704. The IA windows service 703 interfaces with the IA file system filter driver 704 via the Microsoft Windows IFS (Installable File System) and I/O API 701. The IA windows service 703 has several responsibilities: (1) it issues requests to install and uninstall the IA file system filter driver 704 based on the service status; (2) it communicates with the kernel mode IA filter driver 704 by opening a communication port to send commands and requests to the filter on a regular basis for the latest collected list of file requests; (3) it converts the collected file requests using the general method illustrated in FIG. 5 and sends the file requests to the remote content registry 202. The filter driver 704 will monitor I/O requests that pass through an I/O manager 707 that operates in the file system 702 of the media player software 700.

The filter driver 704 is implemented as an instance of a mini-filter that is managed by a file system filter manager 708. Major activities performed by the IA filter driver 704 include: (1) opening a communication port to exchange messages and requests with the user-mode IA windows service 703; (2) registering itself as a mini-filter with the filter manager 708 in the file system; (3) filtering I/O requests (e.g., IRP_MJ_CREATE I/O request packets) that are provided to the file system 702 by the existing player software 700; (4) managing pre- and post-I/O request operation callbacks; (5) examining a media content file signature (e.g., a "Filename" field in the FILE_OBJECT structure or other unique identifier) that is contained in request packets from the media player software and performing necessary actions such as logging the requested unit of media content (for media auditing) or redirecting the request to an alternative choice of media content file (for media content serving); and (6) unloading the filter driver 704 as requested by the IA service 703.

Whenever an I/O request is detected by the file system filter driver 704 that specifies a media content file that should be swapped in favor of a preferred file specified by serving instructions published by the remote content registry service 202, the original I/O request can be redirected to the preferred file. To redirect the original I/O request, the file system mini-filter is capable of monitoring IRP_MJ_CREATE I/O requests by the I/O manager 707. By looking into the FILE_OBJECT structure's "Filename" field the file system mini-filter can determine if the file requested by the media play software 700 is a file that should be replaced with the preferred file. If so, the FILE_OBJECT structure's "Filename" fields are freed from memory, a buffer is allocated from the NONPAGED pool, and the path is set to the preferred file that is to be utilized in place of the originally-requested file. The I/O manager 707 is also requested to re-parse the current request before completing the I/O request. By completing the I/O request, the I/O manager re-sends the request down the filter stack, but this time with the updated file path provided by the file system filter driver 704. Because of the manner in which the replacement is made, the media play software 700 and a lower lever file system driver 706 are not be aware of the replacement to utilize the file path to the preferred file. The result is that the player will display a preferred ad over one that it originally intended to display.

Depending on the implementing technology, other techniques may be used to detect and replace particular units of media content. For example, a similar result may be achieved using MICROSOFT's DirectShow Development Kit by adding a media stream filter using a DirectShow filter. Similar, the MICROSOFT WINDOWS operating system provides for a way to interact with digital signals that are sent to peripherals. Under this scenario, the system may be able to detect and replace the signals being displayed via video displays or other player technology.

As described herein, the disclosed independent auditing and ad service system may detect units of media content that are being presented or about to be presented on media players, and use such information for purposes of auditing or media content serving. It is anticipated that one or more of these functions may be implemented in different media device networks. For example, in some media device networks, the system may only perform auditing functions, in some media device systems, the system may only perform media content service functions, and in some media device systems, the system may perform both auditing and media serving functions. A system operator may tailor the independent auditing and ad service system to meet the requirements of the particular installation.

From the foregoing, it will be appreciated that specific embodiments of the invention have been described herein for purposes of illustration, but that various modifications may be made without deviating from the spirit and scope of the invention. For example, those skilled in the art will appreciate that the steps shown in FIGS. 4 and 5 may be altered in a variety of ways. The order of the blocks may be rearranged, blocks may be performed in parallel, blocks may be omitted, or other blocks may be included. Accordingly, the invention is not limited except as by the appended claims.

We claim:

1. A system for auditing a presentation of media content to natural persons on a plurality of digital media players sited at public locations, the system comprising:
a plurality of agents, each of the plurality of agents operating in conjunction with a digital media player sited at a public location, each of the plurality of agents monitoring a presentation of a plurality of units of media content on the corresponding digital media player; and
an auditing component coupled to the plurality of agents, the auditing component receiving for each digital media player: (1) an operator playlog generated by an operator of the digital media player and reflecting the operator's assessment of a plurality of units of media content presented on the digital media player; and (2) an agent playlog generated by the agent of the digital media player and reflecting the agent's assessment of of a plurality of units of media content presented on the digital media player, the auditing component comparing the agent playlog with the operator playlog to assess an accuracy of the operator playlog for the digital media player.

2. The system of claim 1, wherein each of the plurality of agents monitors the presentation of a plurality of units of media content by monitoring file I/O requests to a data store containing media content in the digital media player.

3. The system of claim 2, wherein the agent playlog includes an identity of a presented unit of media content and the identity of the unit of media content is determined by a filename or a file path.

4. The system of claim 1, wherein each of the plurality of agents monitors the presentation of a plurality of units of media content by monitoring a media stream in the digital media player.

5. The system of claim 1, wherein the agent playlog includes an identity of a presented unit of media content and the identity of the unit of media content is determined by a signature contained in each unit of media content.

6. The system of claim 5, wherein the signature is a unique code associated with each unit of media content.

7. The system of claim 1, wherein the agent playlog includes an identity of a presented unit of media content and a timestamp corresponding to a time of presentation of the unit of media content.

8. The system of claim 1, wherein the auditing component receives the agent playlog following the presentation of two or more units of media content.

9. The system of claim 1, wherein the auditing component receives the agent playlog following the presentation of each unit of media content.

10. The system of claim 1, wherein the auditing component determines the accuracy of the operator playlog by assessing a number of discrepancies between the operator playlog and the agent playlog.

11. The system of claim 10, wherein the auditing component rejects the operator playlog when the number of discrepancies exceeds a threshold.

12. The system of claim 1, wherein assessing the accuracy of the operator playlog comprises assessing a compliance of the comparison between the agent playlog and the operator playlog with an acceptance standard.

13. The system of claim 12, wherein the acceptance standard is defined by an advertiser, a network operator, or an industry group.

14. The system of claim 1, wherein each agent detects an operational status of a corresponding digital media player and the agent playlog only reflects the presentation of each of the plurality of units of media content if the corresponding digital media player was operational.

15. A computer-implemented method of auditing a presentation of media content to natural persons on a digital media player sited at a public location, the computer-implemented method comprising:
    receiving an agent playlog generated by an agent associated with the digital media player and reflecting the agent's assessment of a plurality of units of media content presented on the digital media player;
    receiving an operator playlog generated by an operator of the digital media player and reflecting the operator's assessment of a plurality of units of media content presented on the digital media player; and
    comparing, by at least one computer, the agent playlog with the operator playlog to assess an accuracy of the operator playlog for the digital media player.

16. The computer-implemented method of claim 15, wherein the agent monitors the presentation of the plurality of units of media content by monitoring file I/O requests to a data store containing media content in the digital media player.

17. The computer-implemented method of claim 16, wherein the agent playlog includes an identity of a presented unit of media content and the identity of the unit of media content is determined by a filename or a file path.

18. The computer-implemented method of claim 15, wherein the agent monitors the presentation of the plurality of units of media content by monitoring a media stream in the digital media player.

19. The computer-implemented method of claim 15, wherein the agent playlog includes an identity of a presented unit of media content and the identity of the unit of media content is determined by a signature contained in each unit of media content.

20. The computer-implemented method of claim 19, wherein the signature is a unique code associated with each unit of media content.

21. The computer-implemented method of claim 15, wherein the agent playlog includes an identity of a presented unit of media content and a timestamp corresponding to a time of presentation of the unit of media content.

22. The computer-implemented method of claim 15, wherein the agent playlog is received following the presentation of two or more units of media content.

23. The computer-implemented method of claim 15, wherein the agent playlog is received following the presentation of each unit of media content.

24. The computer-implemented method of claim 15, wherein assessing the accuracy of the operator playlog comprises assessing a number of discrepancies between the operator playlog and the agent playlog.

25. The computer-implemented method of claim 24, further comprising rejecting the operator playlog when the number of discrepancies exceeds a threshold.

26. The computer-implemented method of claim 15, wherein assessing the accuracy of the operator playlog comprises assessing a compliance of the comparison between the agent playlog and the operator playlog with an acceptance standard.

27. The computer-implemented method of claim 26, wherein the acceptance standard is defined by an advertiser, a network operator, or an industry group.

28. The computer-implemented method of claim 15, wherein the agent playlog only reflects the presentation of each of the plurality of units of media content if the digital media player was operational at the time of presentation.

29. A system for auditing a presentation of media content to natural persons on a digital media player sited at a public location, comprising:
    an agent, wherein the agent operates in conjunction with the digital media player and wherein the agent monitors a presentation of a plurality of units of media content on the digital media player; and
    an auditing component coupled to the agent, wherein: an operator playlog generated by an operator of the digital media player and reflecting an assessment of the operator of a plurality of units of media content presented on the digital media player is receivable by the auditing component;
    an agent playlog generated by the agent and reflecting an assessment of the agent of a plurality of units of media content presented on the digital media player is receivable by the auditing component; and
    the agent playlog is comparable with the operator playlog by the auditing component to assess an accuracy of the operator playlog for the digital media player.

* * * * *